Figure 1:
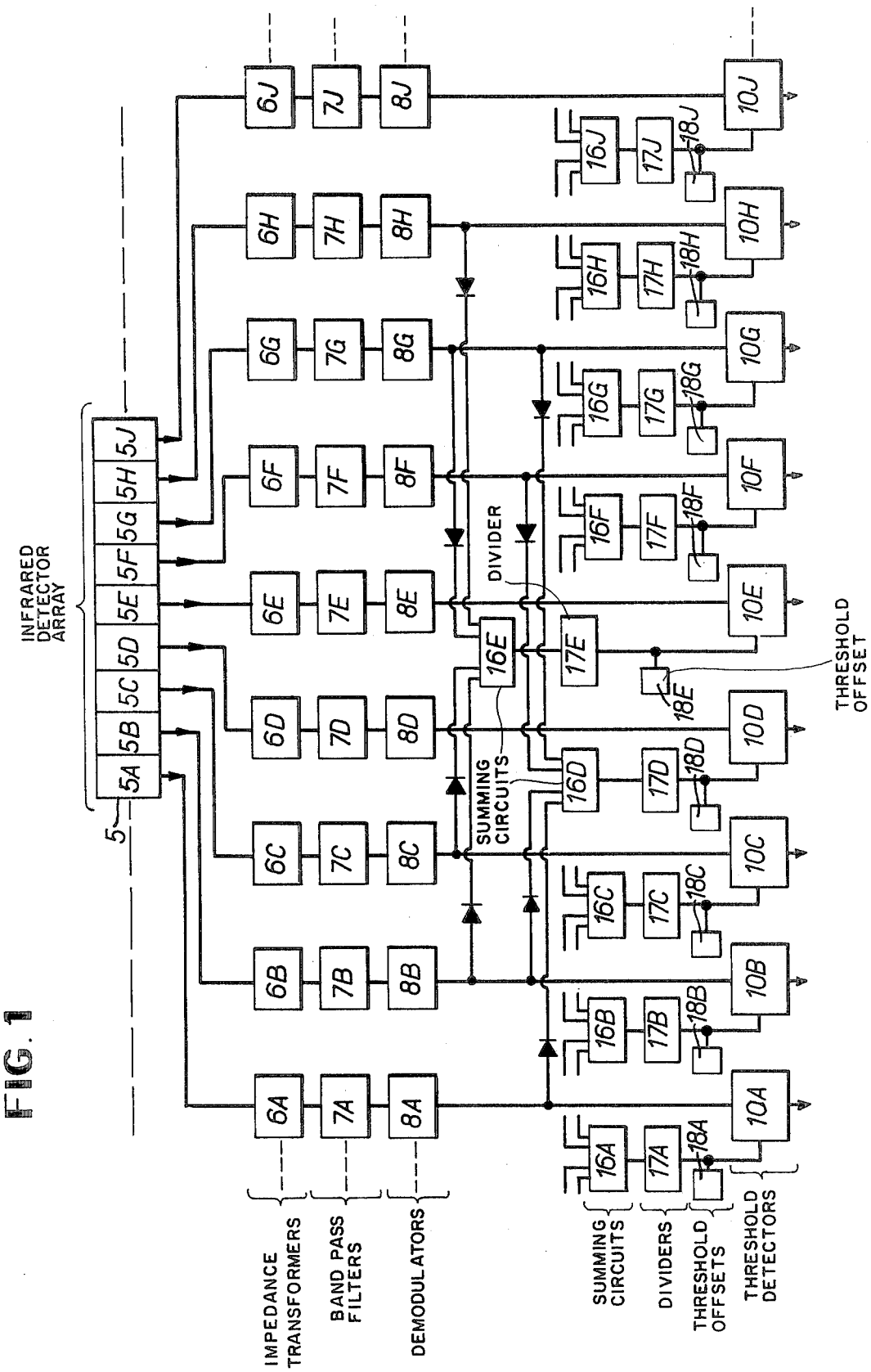

United States Patent [19]

Clark

[11] 4,246,480
[45] Jan. 20, 1981

[54] SURVEILLANCE ARRANGEMENT USING ARRAYS OF INFRARED

[75] Inventor: William J. R. Clark, Essex, England

[73] Assignee: Elliott Brothers, Chelmsford, England

[21] Appl. No.: 881,359

[22] Filed: Feb. 27, 1978

Related U.S. Application Data

[63] Continuation of Ser. No. 671,450, Mar. 30, 1976, abandoned.

[30] Foreign Application Priority Data

Apr. 1, 1975 [GB] United Kingdom ............... 13260/75

[51] Int. Cl.³ .......................... G01J 1/00; H01J 31/49; H01J 40/14
[52] U.S. Cl. .................................... 250/349; 250/332; 250/578
[58] Field of Search ............... 250/578, 330, 332, 333, 250/334, 349

[56] References Cited

U.S. PATENT DOCUMENTS

| 3,753,247 | 8/1973 | Rajchman | 250/578 |
| 3,786,269 | 1/1974 | Cooper | 250/334 |
| 3,904,818 | 9/1975 | Kovac | 250/578 |

Primary Examiner—Stephen C. Ruczinski
Attorney, Agent, or Firm—Diller, Ramik & Wight

[57] ABSTRACT

The invention provides a surveillance system comprising a number of infra-red detectors in an array, each of which is arranged to view a different portion of a field of view in order to discriminate between targets of different veiwed sizes at a target range. Each infra-red detector has in its output a threshold detector, the threshold level of which is determined by the mean output levels of adjacent detectors in the array. In a preferred example, for a given threshold detector in the output of a given infra-red detector the mean output level of two adjacent, but not immediately adjacent, infra-red detectors on one side and two adjacent, but not immediately adjacent detectors, on the other side are summed and the result divided by four to provide the reference level for the threshold detector concerned.

17 Claims, 2 Drawing Figures

SURVEILLANCE ARRANGEMENT USING ARRAYS OF INFRARED

This is a continuation, of application Ser. No. 671,450 filed Mar. 30, 1976, now abandoned.

This invention relates to surveillance systems and more specifically to surveillance systems utilising infra-red detectors.

Our co-pending application number 12072/75 relates to surveillance systems of this kind and in its preferred aspects provides a surveillance arrangement comprising a television system including television camera means for viewing a scene, a television display arrangement for displaying the scene viewed by said television camera means and an array of individual infra-red detectors imaged into space so as to have the same field of view in one plane at a desired target range as the television system, said infra-red detectors being arranged to provide brighten-up signals for said display to highlight heat emitting targets in said scene at said target range.

Whether the infra-red portion of a system is combined with a television display as above described or utilised alone to provide, as it were, an infra-red plot it is often arranged for the portion of the field of view viewed by each infra-red detector to correspond in at least the transverse direction to the transverse dimension of a target of interest at the target range. In our co-pending application, for example, reference is made to the correspondence between the portion of the field of view viewed by each element and the viewed size of a fighting tank at the target range.

The present invention seeks to provide improved surveillance systems utilising infra-red detectors in which a degree of discrimination is provided between targets of different viewed sizes at the target range.

According to this invention a surveillance system comprises a number of infra-red detectors in an array each arranged to view a different portion of a field of view and a threshold detector provided in the output path of each infra-red detector, each threshold detector being arranged to have a threshold level which is dependent upon the output signal levels of adjacent detectors in said array.

Preferably said infra-red detectors are arranged in a linear array and are arranged to view adjacent portions of said field of view, in which case preferably the threshold level of a threshold detector in the output path of a given infra-red detector is arranged to be determined by the output signal levels of infra-red detectors on either side of said given detector but not immediately adjacent thereto.

Normally the threshold level of a given threshold detector is arranged to equal the mean output signal level of the infra-red detectors which determine the same plus, if required, an additional threshold quantum to discriminate against noise and other false responses having a level below that normally provided by a target of interest whereby said given threshold detector will pass an output signal from the infra-red detector in whose output path it is provided only if that output signal is greater than the mean output signal level of the adjacent infra-red detectors which determine said threshold level. In this case the output signals from the infra-red detectors which determine the threshold level are given equal weighting.

Preferably the number of infra-red detectors utilised to determine the threshold level of a given threshold level detector is four, two on one side in the array of the infra-red detector in whose output path said given threshold level detector is provided, and two on the other.

Preferably said infra-red detectors are pyro-electric detectors, for example of the TGS or $PVF_2$ type, in which case preferably means are provided for chopping radiation falling upon said detectors so that the output of each detector comprises a carrier frequency, dependent upon the frequency of chopping, upon which wanted signals appear as modulation and the output of each detector is applied via individual impedance transforming means, individual narrow bandpass filter means and individual demodulating means for utilisation, in which case said threshold detectors are preferably connected in the output paths of said individual demodulating means and for the purpose of determining the threshold levels of said threshold level detectors output signals are taken from said individual demodulating means.

The invention is particularly applicable to a surveillance system as claimed in any of the claims of our aforementioned co-pending application number 12072/75

Figure 2:
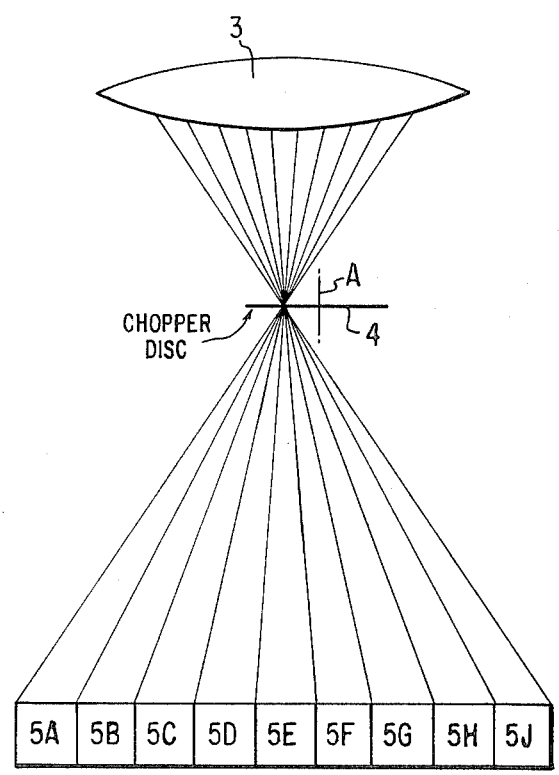

The invention is illustrated in and further described with reference to the accompanying drawings wherein:

FIG. 1 is a block schematic illustrating part of one surveillance system according to this invention; and FIG. 2 is a schematic view illustrating the chopper and imaging system.

Referring to the drawing, the airborne surveillance system illustrated is in accordance with the invention in our co-pending application number 12072/75 and like references are used for like parts in FIG. 1 of the drawings accompanying the specification of that application. In the present case only the infra-red processing circuits are illustrated. The remainder of the system may be as illustrated in FIG. 1 of our co-pending application.

A linear array 5 of 128 individual infra-red detector elements, of which only nine are shown referenced 5A to 5J, is imaged into space by a suitable lens or imaging system 3 shown in FIG. 2, as described in our co-pending application, so as to contact the ground at a desired target range in a field of view 3. Each detector element is a pyro-electric detector of the TGS or $PVF_2$ type.

The detector elements are arranged as shown in FIG. 2 with respect to the imaging system 3 so that they lie in the focal plane thereof.

On the front of the array 5 of infra-red detectors is a conventional radiation chopper 4, see FIG. 2 disc 4 rotatable about the axis A as shown in FIG. 2 so as to chop the incoming radiation falling on the array 5 of infra-red detectors to produce in the output of each detector a carrier of 20 Hz modulated with the required signal.

The output of each individual infra-red detector FA to FJ is applied to an individual impedance transformer referenced respectively 6A to 6J. Each individual impedance transformer consists of a JFET followed by an Operational Amplifier. These individual impedance transformers 6A to 6J are provided to overcome the high impedance of the detectors and produce 1/f noise which swamps the noise from the detectors themselves.

The output of each impedance transformer 6A to 6J is applied an individually matched narrow bandpass filter, referenced respectively 7A to 7J, each of which is centered on the 20 Hz carrier frequency in order to remove 1/f noise near zero frequency.

The output of each individually matched narrow bandpass filter is applied to an individual demodulator, referenced respectively 8A to 8J, each of which removes the 20 Hz carrier.

The output of each individual demodulator 8A to 8J is connected to an individual threshold detector, referenced respectively 10A to 10J.

As so far described the infra-red processing circuitry is similar to that described in our co-pending application except that the threshold level of each of the individual threshold detectors 10A to 10J is not preset, but is arranged to be variable as now to be described. Taking as an example the threshold detector 10E provided in the output path of infra-red detector 5E, a summing circuit 16E is provided to sum output signals derived from demodulators 8B, 8C, 8G, 8H. In other words, this sums output signals derived from adjacent, but not the immediately adjacent, infra-red detectors in the array to either side of the infra-red detector 5E. The output of summing circuit 16E is connected to a divider 17E which divides by the number of inputs to summing circuit 16E, in this case four. Thus at the output of divider 17E appears a signal which represents the mean of the output signals from demodulators 8B, 8C, 8G and 8H. This is applied to set the threshold level of threshold detector 10E. In addition, a "threshold off-set" reference signal circuit 18E is provided which adds an additional quantum to the threshold provided by the mean of the output signals from demodulators 8B, 8C, 8G, 8H in order to discriminate against noise. In many cases the provision of a threshold off-set such as is provided by 18E is not required, particularly if at some point prior to the sampling for the purposes of determining threshold the individual signal channels are already subject to a threshold level for the purposes of suppressing noise. The effect achieved is that now an output signal will only be derived from threshold detector 10E if the response generated by infra-red detector 5E is greater than the mean response being generated by infra-red detectors 5B, 5C, 5G, 5H. Thus, assuming that at the target range a target of interest, such as a fighting tank, corresponds in size the portion of the field of view viewed by one of the infra-red detectors, a response from detector 5E will be passed by threshold detector 10E provided the mean signal level derived from detectors 5B, 5C, 5G, 5H is not such as to indicate a target of such continuous length as to preclude it from being a fighting tank. The reason for not utilising output signals from infra-red detectors 5D and 5F immediately adjacent infra-red detector 5E is that the target may not be wholly contained within the portion of the field of view viewed by infra-red detector 5E, but, might, for example, extend partly in the portion of the field of view viewed by infra-red detector 5E and partly in the portion of the field of view viewed by infra-red detector 5D or 5F.

Similar summing circuits referenced respectively 16A to 16J, similar dividing circuits referenced respectively 18A to 18J and similarly threshold off-set reference circuits referenced respectively 18A to 18J are provided for the remaining threshold detector circuits 10A to 10J. In order to avoid undue complication in the drawing only the summing circuit 16D is shown complete with its connections to the outputs of demodulators 8A, 8B, 8F and 8G. It will be appreciated that the remaining summing circuits are connected to receive similarly patterns of input signals from the outputs of the individual demodulators. Summing circuit 16C for example deceives signals from the output of demodulator 8A, the demodulator for the infra-red detector which proceeds detector 5A in the array, the output of demodulator 8E and the output of demodulator 8F.

The first and last three infra-red detectors in the array are provided purely for the purposes of establishing the threshold level in respect of the fourth to the (N−3)th of the infra-red detectors.

I claim:

1. A surveillance system comprising a number of infra-red detectors in an array with each detector being arranged to view a different portion of a field of view and a threshold detector provided in the output path of each infra-red detector, each threshold detector being arranged to have a threshold level which is dependent upon the output signal levels of adjacent infra-red detectors in said array and being operative to pass output from the infra-red detector with which it is associated, for surveillance utilization, if the output signal level of the infra-red detector last mentioned is relatively high compared to the output signal levels of said adjacent infra-red detectors.

2. A system as claimed in claim 1 and wherein said infra-red detectors are arranged in a linear array and are arranged to view adjacent portions of said field of view.

3. A system as claimed in claim 2 and wherein the threshold level of a threshold detector in the output path of a given infra-red detector is arranged to be determined by the output signal levels of infra-red detectors on either side of said given detector but not immediately adjacent thereto.

4. A system as claimed in claim 3 and wherein the threshold level of a given threshold detector is arranged to equal the mean output signal level of the infra-red detectors which determine the same plus an additional threshold quantum to discriminate against noise and other false responses having a level below that normally provided by a target of interest whereby said given threshold detector will pass an output signal from the infra-red detector in whose output path it is provided only if that output signal is greater than the mean output signal level of the adjacent infra-red detectors which determine said threshold level.

5. A system as claimed in claim 2 and wherein the number of infra-red detectors utilised to determine the threshold level of a given threshold level detector is four, two on one side in the array of the infra-red detector in whose output path said given threshold level detector is provided, and two on the other.

6. A system as claimed in claim 1 and wherein said infra-red detectors are pyro-electric detectors.

7. A system as claimed in claim 6 and wherein means are provided for chopping radiation falling upon said detectors so that the output of each detector comprises a carrier, frequency, dependent upon the frequency of chopping, upon which wanted signals appear as modulation and the output of each detector is applied via individual impedance transforming means, individual narrow bandpass filter means and individual demodulating means for utilisation.

8. A system as claimed in claim 7 and wherein said threshold detectors are connected in the output paths of said individual demodulating means and for the purpose of determining the threshold levels of said threshold level detectors output signals are taken from said individual demodulating means.

9. A surveillance system comprising a number of infra-red detectors in an array with each detector being arranged to view a different portion of a field of view and each detector having a signal output path, variable threshold detector means in each signal output path for passing only those output signals which exceed the threshold thereof, and control means individually controlling thresholds of said threshold detector means for causing such thresholds to vary in accord with the levels of output signals generated by adjacent infra-red detectors in said array.

10. A surveillance system comprising an array of infra-red detectors arranged to view a field at a given target distance whereby a target of interest forms an image of particular dimension on the array, each detector producing an output signal whose level depends upon the intensity of infra-red energy incident thereon, variable threshold means connected in the signal output path of each detector for passing the associated output signal to the extent that it exceeds the contemporary threshold level of that variable threshold means, and threshold control means controlling individual thresholds of said variable threshold means for discriminating against targets producing images on the array which are significantly larger than said particular dimension.

11. A surveillance system as defined in claim 10 wherein the means last mentioned comprises circuitry connected with each variable threshold means and with the outputs of adjacent detectors which are spaced apart by an amount greater than said particular dimension.

12. In a surveillance system including a plurality of infra-red detectors disposed cumulatively to image at least a portion of a field of view within which a target of interest may be located, each detector producing an output signal whose level is dependent upon the amount of infra-red radiation incident thereon, and variable threshold means in the output signal path of at least one of said detectors for passing the output signal of said one detector, for surveillance utilization, if the output signal level of said one detector is relatively high compared to the output signal levels of adjacent infra-red detectors.

13. In a surveillance system as defined in claim 12 wherein said adjacent detectors are on either side of said one detector.

14. In a surveillance system as defined in claim 12 wherein said adjacent detectors are on either side of said one detector but not immediately adjacent thereto.

15. In a surveillance system as defined in claim 12 wherein said variable threshold means includes means for determining the mean output signal level of said adjacent detectors.

16. A surveillance system as defined in claim 1 wherein the threshold level of a given threshold detector is arranged to equal the mean output signal level of the infra-red detectors which determine the same whereby said given threshold detector will pass an output signal from the infra-red detector in whose output path it is provided only if that output signal is greater than said mean output signal level.

17. A system as claimed in claim 3 and wherein the threshold level of a given threshold detector is arranged to equal the mean output signal level of the infra-red detectors which determine the same whereby said given threshold detector will pass an output signal from the infra-red detector in whose output path it is provided only if that output signal is greater than the mean output signal level of the infra-red detectors which determine said threshold level.

* * * * *